United States Patent [19]
Liao

[11] Patent Number: 5,702,093
[45] Date of Patent: Dec. 30, 1997

[54] SHOCK ABSORBING DEVICE FOR A BICYCLE SEAT

[76] Inventor: Chi-chao Liao, No. 5, Lane 2, Tungyang Rd., Fengyuan City, Taichung Hsien, Taiwan

[21] Appl. No.: 746,004

[22] Filed: Nov. 5, 1996

[51] Int. Cl.$^6$ ..................................................... F16F 1/00
[52] U.S. Cl. .......................... 267/132; 267/145; 267/141; 297/195.1
[58] Field of Search ........................ 267/132, 141, 267/142, 145, 153, 292; 248/567, 634; 297/196, 215.1, 215.13, 215.15, 195.1

[56] References Cited

U.S. PATENT DOCUMENTS

| | | | |
|---|---|---|---|
| Re. 24,911 | 12/1960 | Leja | 267/132 X |
| 5,443,301 | 8/1995 | Lai | 297/195.1 |
| 5,489,139 | 2/1996 | McFarland | 297/195.1 |
| 5,547,155 | 8/1996 | Herting | 297/215.15 X |

*Primary Examiner*—Josie Ballato
*Attorney, Agent, or Firm*—Hedman, Gibson & Costigan, P.C.

[57] ABSTRACT

A shock absorbing device includes a bracket having a lower portion pivotally engaged with one side portion of a base frame. A supporting base has one end portion pivotally engaged with an upper portion of the bracket. A shock absorbing block is received in the bracket and has an upper portion abutting on an underside of a mediate portion of the supporting base.

6 Claims, 5 Drawing Sheets

SHOCK ABSORBING DEVICE FOR A BICYCLE SEAT

FIELD OF THE INVENTION

The present invention relates to a shock absorbing device, and more particularly to a shock absorbing device for a bicycle seat.

BACKGROUND OF THE INVENTION

When a bicycle is ridden over rough terrain such as a rugged or rocky road, an external force is exerted on a seat of the bicycle due to an impact or shock created thereon whereby a rider of the bicycle may feel discomfort and not be able to control the bicycle so well.

The present invention has arisen to mitigate and/or obviate the above-mentioned problem.

SUMMARY OF THE INVENTION

The primary objective of the present invention is to provide a shock absorbing device adapted for providing a buffer effect to a bicycle.

In accordance with one aspect of the present invention, there is provided a shock absorbing device comprising a base frame having first side portion and a second side portion. A bracket has a lower portion pivotally engaged with the second side portion of the base frame and has a space defined therein. A supporting base has one end portion pivotally engaged with an upper portion of the bracket. A shock absorbing block is received in the space of the bracket and has an upper portion abutting on an underside of a mediate portion of the supporting base.

Further features of the present invention will become apparent from a careful reading of the detailed description with reference to the accompanying drawings.

DETAILED DESCRIPTION OF THE PREFERRED EMBODIMENTS

Figure 1:
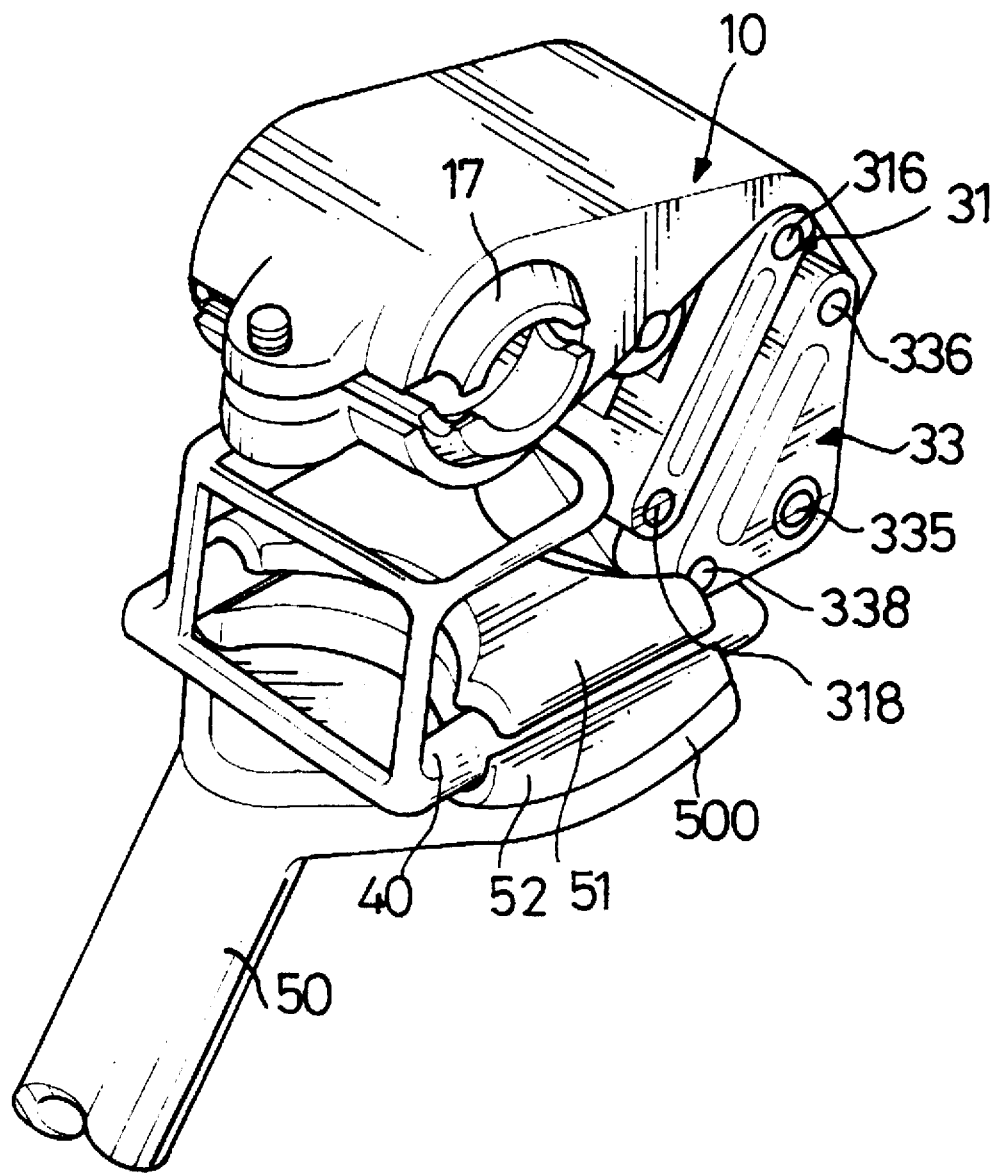
FIG. 1 is a perspective view of a shock absorbing device in accordance with the present invention.
Figure 2:
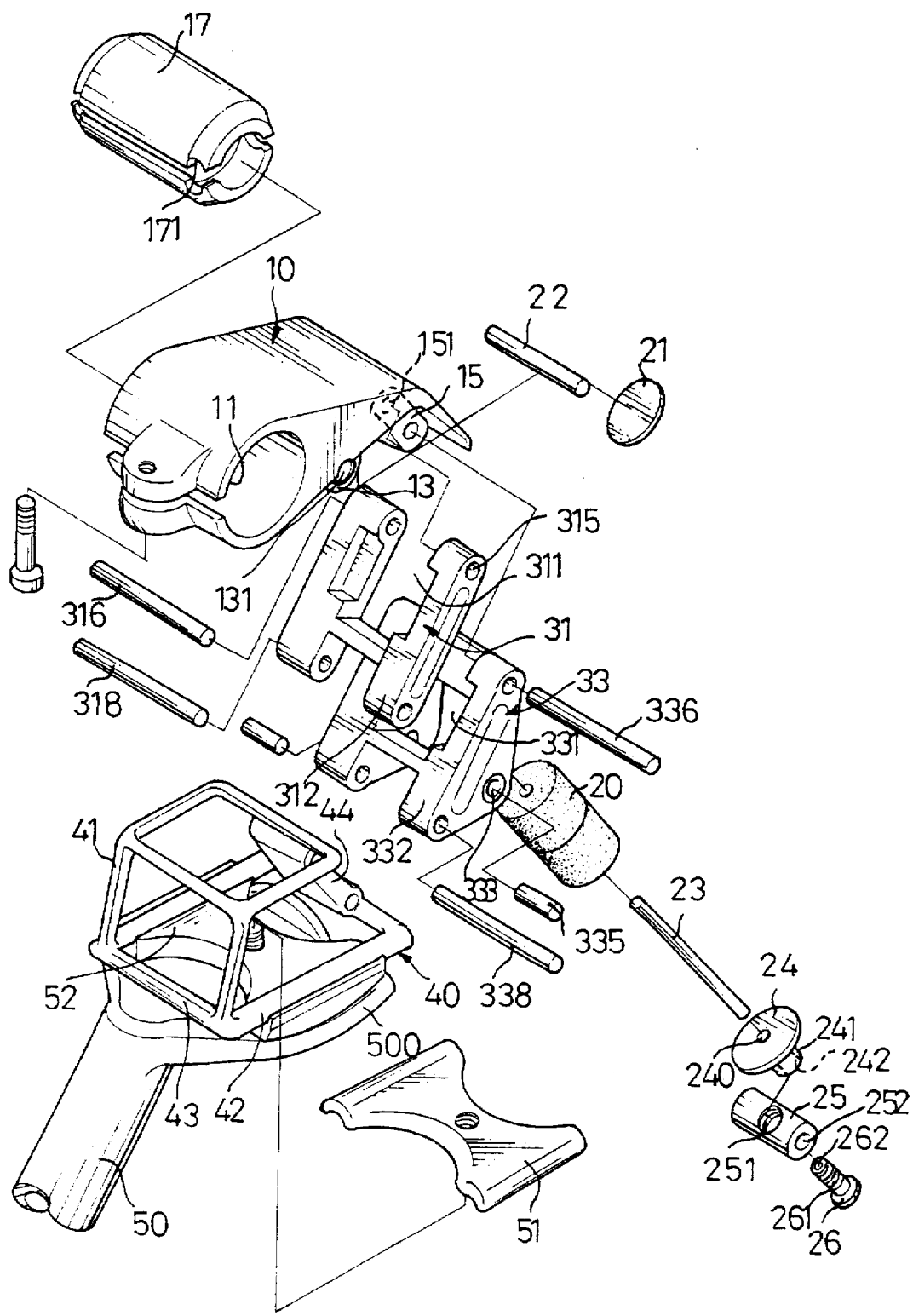
FIG. 2 is an exploded view of FIG. 1.
Figure 3:
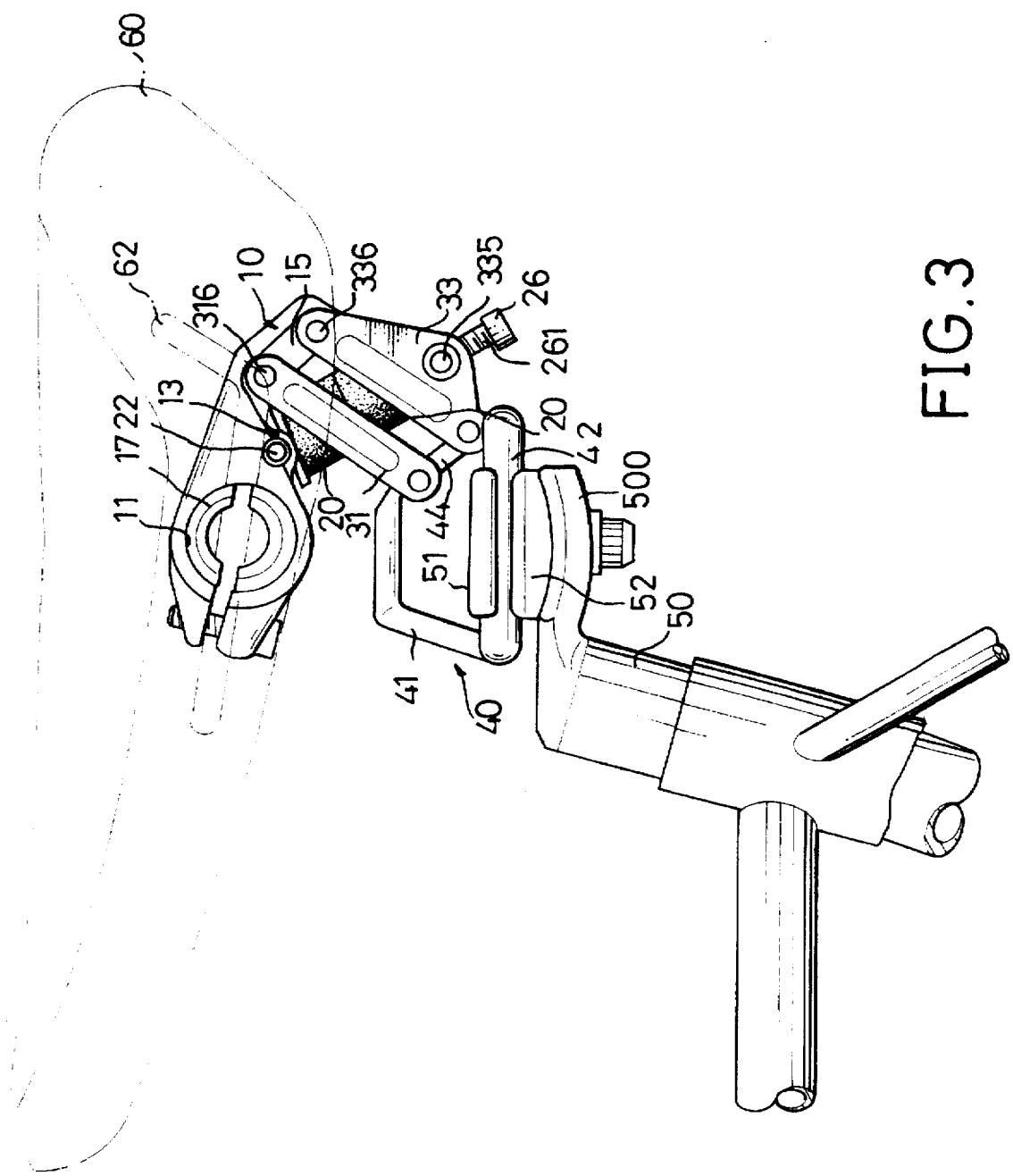
FIG. 3 is a front plan view of FIG. 1.

Referring to the drawings, and initially to FIGS. 1-3, a shock absorbing device in accordance with the present invention is properly adapted for providing a buffer effect to a bicycle and is mounted between a seat 60 and a seat post 50 of the bicycle.

The shock absorbing device comprises a base frame 40 having first side portion 41 and a second side portion 44. Preferably, the base frame 40 also includes two spaced lengthwise beams 42 and two crosswise beams 43.

A bracket 33 has a lower portion pivotally engaged with the second side portion 44 of the base frame 40 by means of a pivot pin 338 and has a space 331 defined therein.

A supporting base 10 includes a first end portion, a mediate portion and a second end portion having an extension 15 extending downwardly and pivotally engaged with an upper portion of the bracket 33 by means of a pivot pin 336.

A passage 11 is transversely defined in the first end portion of the supporting base 10. Two half-cylindrical fasteners 17 are each received in the passage 11 and coupled with each other. Each of the two fasteners 17 includes two end portions each having a recess 171 defined therein and aligning with each other.

A shock absorbing block 20 is received in the space 331 of the bracket 33 and has an upper portion abutting on an underside of the mediate portion of the supporting base 10.

An auxiliary bracket 31 is mounted between the supporting base 10 and the bracket 33 and includes an upper portion pivotally engaged with the extension 15 of the second end portion of the supporting base 10 by means of a pivot pin 316 and a lower portion pivotally engaged with the second side portion 44 of the base frame 40 by means of a pivot pin 318. An opening 311 is defined in the auxiliary bracket 31 for receiving the shock absorbing block 20 therein.

Preferably, the extension 15 has a hole 151 defined in an upper portion thereof. The auxiliary bracket 31 includes two side walls 312 each having a bore 315 defined in an upper portion thereof and aligning with the hole 151 for allowing passage of the pivot pin 316. The hole 151 of the extension 15 has a dimension greater than an outer diameter of the pivot pin 316 such that the supporting base 10 can be displaced relative to the auxiliary bracket 31 and the pivot pin 316 as shown in FIGS. 4 and 5.

Two spaced ears 13 each extend downwardly from the underside of the mediate portion of the supporting base 10 and each have a bore 131 transversely defined therein. An axle 22 extends through each of the two bores 131. An urging disk 21 located between the two spaced ears 13 is fixedly mounted on an underside of the axle 22 and securely abuts on the upper portion of the shock absorbing block 20.

A positioning rod 23 extends through the shock absorbing block 20 and has an upper end fixedly mounted on an underside of the urging disk 21.

Figure 4:
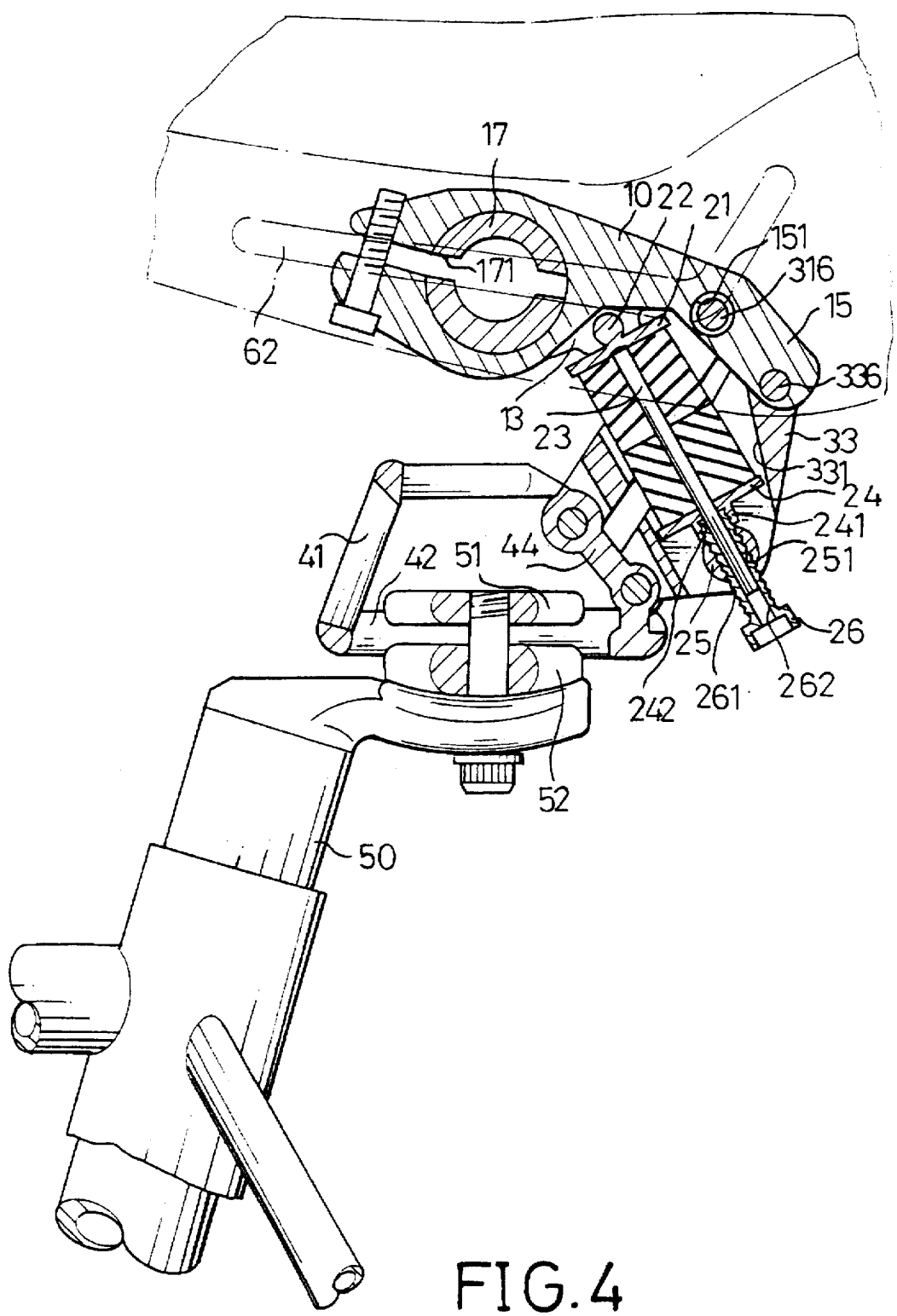
FIG. 4 is a front plan cross-sectional view of FIG. 1.
Figure 5:
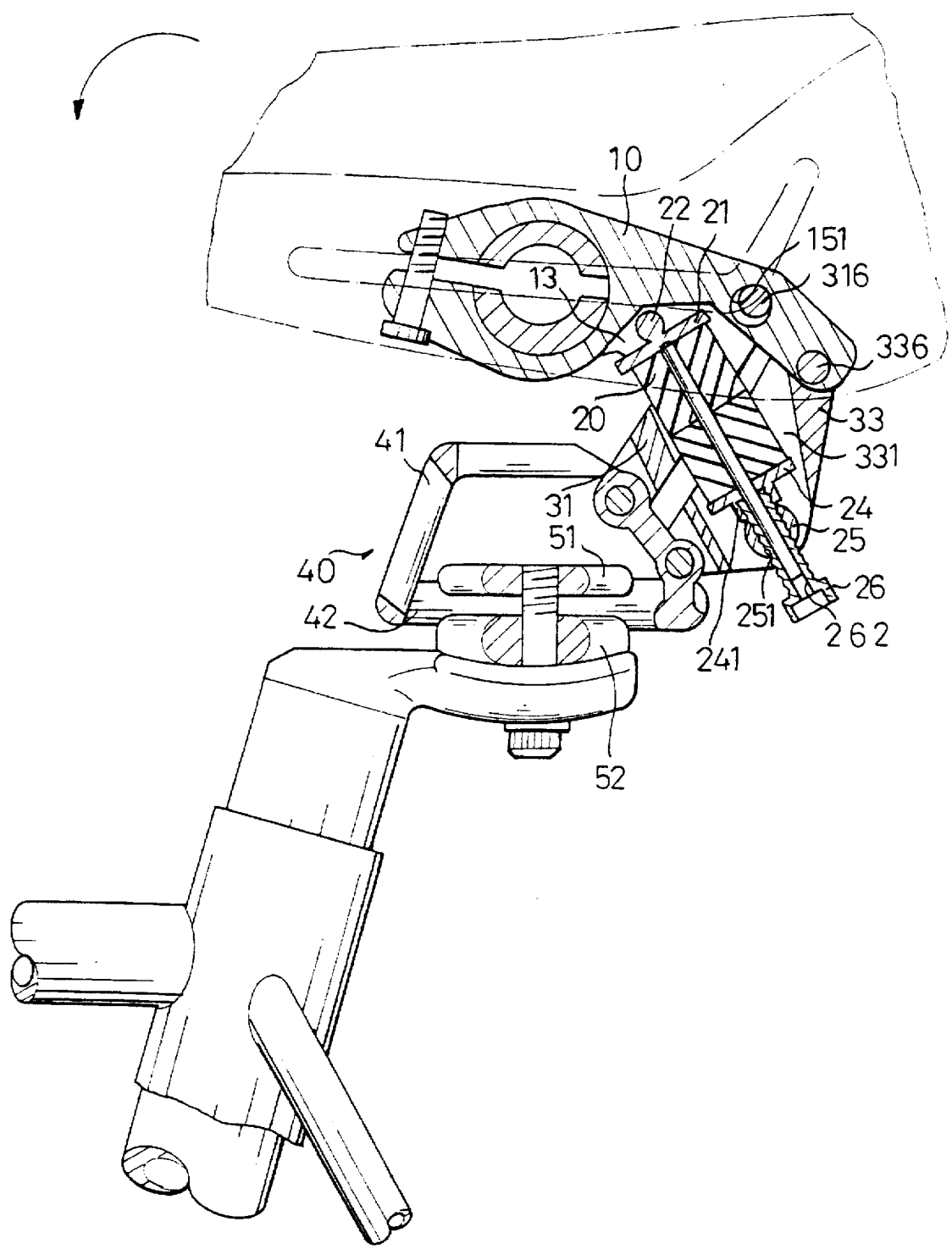
FIG. 5 is an operational view of FIG. 4.

Referring to FIGS. 2-4, the space 331 extends through the lower portion of the bracket 33. A rod 25 is fixedly mounted on the lower portion of the bracket 33 and received in the space 331. A hole 251 is defined by a threaded wall of the rod 25.

Preferably, the bracket 33 includes two triangular side walls 332 each having a bore 333 defined in a lower portion thereof. The rod 25 is securely retained between the two side walls 332 of the bracket 33 and has two distal ends each having an aperture 252 defined therein and aligning with each of the two bores 333. Two positioning pins 335 each extend through a corresponding one of the two bores 333 and an associated aperture 252, thereby positioning the rod 25 in the bracket 33 between the two side walls 332.

An adjusting bolt 26 is mounted on an underside of the rod 25 and has a threaded shank 261 threadedly mounted in the hole 251 and extending outward of the rod 25.

An abutting piece 24 is securely mounted on a lower portion of the shock absorbing block 20, and a post 241 extends from an underside of the abutting piece 24 and is urged on the threaded shank 261 of the adjusting bolt 26. Preferably, the post 241 has a socket 242 defined therein for partially receiving the threaded shank 261 of the adjusting bolt 26.

Preferably, the abutting piece 24 has a compartment 240 defined therein and the threaded shank 261 of the adjusting bolt 26 has a guiding hollow 262 defined therein for allowing passage of a lower end of the positioning rod 23.

In assembling, referring to FIGS. 2-4, the seat post 50 of the bicycle has an extension 500 extending from an upper portion thereof. A lower saddle clamp 52 is fixedly mounted on the extension 500 for supporting the two lengthwise beams 42 thereon. An upper saddle clamp 51 is fixedly coupled with the lower saddle clamp 52 for clamping the two lengthwise beams 42 therebetween, thereby securely positioning the base frame 40 on the extension 500 of the seat post 50.

In addition, the seat 60 of the bicycle includes two spaced rails 62 each received in and retained by the recess 171 of each of the two fasteners 17 such that the seat 60 can be fixedly mounted on the supporting base 10.

In operation, referring to FIGS. 3–5 with reference to FIG. 2, a play is created in the hole 151 between an inner periphery of the extension 15 and the pivot pin 316 as shown in FIG. 4 such that the supporting base 10 can be pivoted relative to the bracket 33.

When the bicycle is ridden on a rugged or rocky road such that an external force or shock is exerted on the seat 60, the supporting base 10 can be pivoted relative to the bracket 33 and the extension 15 can be moved toward the pivot pin 316 from a status as shown in FIG. 4 to a status as shown in FIG. 5.

The urging disk 21 can then be moved by the axle 22 located between the two ears 13 of the supporting base 10 to be urged on the shock absorbing block 20, thereby providing a cushion effect on the seat 60.

It should be clear to those skilled in the art that further embodiments of the present invention may be made without departing from the scope and spirit of the present invention.

What is claimed is:

1. A shock absorbing device comprising:
   a base frame having first side portion and a second side portion;
   a bracket having a lower portion pivotally engaged with the second side portion of said base frame and an upper portion, said bracket having a space defined therein;
   a supporting base having a first end portion, a mediate portion and a second end portion pivotally engaged with the upper portion of said bracket;
   a shock absorbing block received in said space of said bracket and having an upper portion abutting on an underside of the mediate portion of said supporting base; and
   an auxiliary bracket mounted between said supporting base and said bracket, said auxiliary bracket having an upper portion pivotally engaged with the second end portion of said supporting base, a lower portion pivotally engaged with the second side portion of said base frame and an opening defined in said auxiliary bracket for receiving said shock absorbing block.

2. The shock absorbing device in accordance with claim 1, wherein two spaced ears each extend downwardly from the underside of the mediate portion of said supporting base and each have a bore transversely defined therein, an axle extending through each of said two bores, a disk located between said two spaced ears being fixedly mounted on an underside of said axle and abutting on the upper portion of said shock absorbing block.

3. The shock absorbing device in accordance with claim 2, further comprising a positioning rod extending through said shock absorbing block and having an upper portion fixedly mounted on an underside of said disk.

4. The shock absorbing device in accordance with claim 1, wherein said space extends through the lower portion of said bracket, a rod fixedly mounted on the lower portion of said bracket and received in said space, a hole defined by a threaded wall of said rod, an adjusting bolt mounted on an underside of said rod and having a threaded shank slidably mounted in said hole and extending outward of said rod, an abutting piece mounted on a lower portion of said shock absorbing block, and a post extending from an underside of said abutting piece and urged on said threaded shank of said adjusting bolt.

5. The shock absorbing device in accordance with claim 4, wherein said post defines a socket therein for partially receiving said threaded shank of said adjusting bolt.

6. The shock absorbing device in accordance with claim 1, wherein said supporting base has a passage transversely defined in the first end portion thereof, two half-cylindrical fasteners each received in said passage and coupled with each other, each of said two fasteners including two end portions each defining a recess therein and aligning with each other.

\* \* \* \* \*